US006876919B2

(12) United States Patent
James et al.

(10) Patent No.: US 6,876,919 B2

(45) Date of Patent: Apr. 5, 2005

(54) CYLINDER SPECIFIC PERFORMANCE PARAMETER COMPUTED FOR AN INTERNAL COMBUSTION ENGINE

(75) Inventors: John Victor James, Walled Lake, MI (US); Margherita Zanini-Fisher, Bloomfield Hills, MI (US); Ryan Lee Baker, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 10/064,192

(22) Filed: Jun. 20, 2002

(65) Prior Publication Data

US 2003/0236611 A1 Dec. 25, 2003

(51) Int. Cl.[7] ........................... G06G 7/70; G06F 19/00

(52) U.S. Cl. ....................... 701/111; 701/110; 701/106; 123/198 F; 123/436; 123/481; 123/406.24; 123/406.47

(58) Field of Search ................................ 701/111, 106, 701/110; 123/198 F, 436, 481, 406.24, 406.47

(56) References Cited

U.S. PATENT DOCUMENTS

| | | | | | |
|---|---|---|---|---|---|
| 4,525,781 | A | | 6/1985 | Konomi et al. | |
| 5,044,194 | A | | 9/1991 | James et al. | |
| 5,044,195 | A | | 9/1991 | James et al. | |
| 5,056,360 | A | | 10/1991 | Dosdall et al. | |
| 5,157,965 | A | | 10/1992 | Koegeler et al. | |
| 5,497,328 | A | * | 3/1996 | Sugai et al. | 701/111 |
| 5,631,411 | A | | 5/1997 | Harms et al. | |
| 5,806,506 | A | * | 9/1998 | Kitamura et al. | 123/673 |
| 5,991,684 | A | * | 11/1999 | Fukuchi et al. | 701/110 |
| 6,061,624 | A | * | 5/2000 | Kashimura et al. | 701/110 |
| 6,223,120 | B1 | | 4/2001 | Williams | |
| 6,234,145 | B1 | * | 5/2001 | Shomura | 123/406.24 |
| 6,292,757 | B1 | * | 9/2001 | Flanagan et al. | 702/138 |

OTHER PUBLICATIONS

Jeremy Williams and Metthew C. Witter, Individual Cylinder IMEP Estimation Using Crankshaft Angular Velocity Measurements, 2001–01–0990, Dynasim Research Ltd., Society of Automotive Engineers, Inc.

* cited by examiner

Primary Examiner—Willis R. Wolfe
Assistant Examiner—Johnny H. Hoang
(74) Attorney, Agent, or Firm—Diana D. Brehob

(57) ABSTRACT

A method for estimating a cylinder specific performance parameter for a specific cylinder of an internal combustion engine for each firing attempt, which relies on production sensors commonly equipped onboard production vehicles, is disclosed.

42 Claims, 4 Drawing Sheets

CYLINDER SPECIFIC PERFORMANCE PARAMETER COMPUTED FOR AN INTERNAL COMBUSTION ENGINE

BACKGROUND OF THE INVENTION

1. Field of the Invention

The present invention relates generally to a method for estimating indicated mean effective pressure on each cylinder of an internal combustion engine for each firing attempt.

2. Background of the Invention

Computational methods to estimate the power produced in each cylinder of an engine have been developed, as described in U.S. Pat. No. 6,223,120. The inventors of '120 have disclosed a technique in which, based on the torsional characteristics of the engine and a measure of engine speed sampled at high bandwidth, the power produced in each cylinder can be computed. Such information can be used to determine a cylinder providing more or less power than the others. The inventors of the present invention have recognized disadvantages in this prior approach because the technique, disclosed in '120, computes engine power in each cylinder, but not instantaneously. Instead, the method of '120 requires sampling over a considerable period of time to obtain a reliable measurement. Thus, '120 appears to provide a measure of engine power in the cylinder only under steady speed conditions and recurring conditions. The inventors of the present invention have recognized that an intermittent condition, such as an occasional misfire, may not be detected using the method described in '120. The method in '120 is suitable for engines operating at steady conditions, such as power generating engines or pumping station engines, but is not well suited for automobile engines in which engine speed changes regularly. Another disadvantage is that the method in '120 involves Fourier analysis, which would tax onboard engine computers as this type of analysis is computationally intensive.

SUMMARY OF THE INVENTION

Disadvantages of prior art methods are overcome by a method for determining a cylinder specific performance parameter for a cylinder of a multi-cylinder internal combustion engine, in which a performance parameter representative of engine output across a first group of cylinders based on an engine operating parameter and a cylinder deviation parameter representative of engine output of a single combustion event in the cylinder are determined. Based on the cylinder specific performance parameter and the cylinder deviation parameter, the cylinder specific performance parameter can be computed.

The engine rotational acceleration deviation is based on the difference between a cylinder specific rotational acceleration and a rotational acceleration average, both being determined from the rotational speed of the engine.

Preferably, the cylinder specific performance parameter is indicated mean effective pressure (IMEP) for a specific cylinder and said group of cylinders comprise all engine cylinders or a cylinder bank. The engine performance parameter is based on one or more of: air flow rate to the engine, ignition timing, air-fuel ratio, fuel pulse width, and a quantity of exhaust gas recirculation.

An advantage of the present invention is that an estimate of, or other cylinder specific performance parameter, can be obtained under transient conditions as well as steady-state. Thus, the method disclosed herein is well suited for engines in which speed is frequently changing such as the case for engines installed in automobiles.

Another advantage is that an estimate of a cylinder specific performance parameter, according to an aspect of the present invention, is much less computationally intensive than prior art methods.

An advantage of the present invention is that it relies on sensors that are available on most current engines. Furthermore, the method does not rely on in-cylinder pressure transducers which can be costly and difficult to package.

Yet another advantage is that if the engine were equipped with sensors providing redundant measures of the performance parameter (in-cylinder pressure transducers, as an example), the estimate of the performance parameter, as provided by the present invention, can be used to determine anomalous behavior, sensor drift, or aging of the other sensors. Such information can be used to update calibratable coefficients in the electronic control unit or to determine when a sensor falls out of operational limits.

Although prior art methods are able to detect a misfire in a cylinder, an advantage of the present invention is that by providing a measure of a cylinder specific performance parameter, such as IMEP, the magnitude of a deficit in a lower performing cylinder can be evaluated. Thus, for example, a cylinder which is deteriorating over time can be detected prior to the cylinder deteriorating to the point of complete misfire.

The above advantages, other advantages, and features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
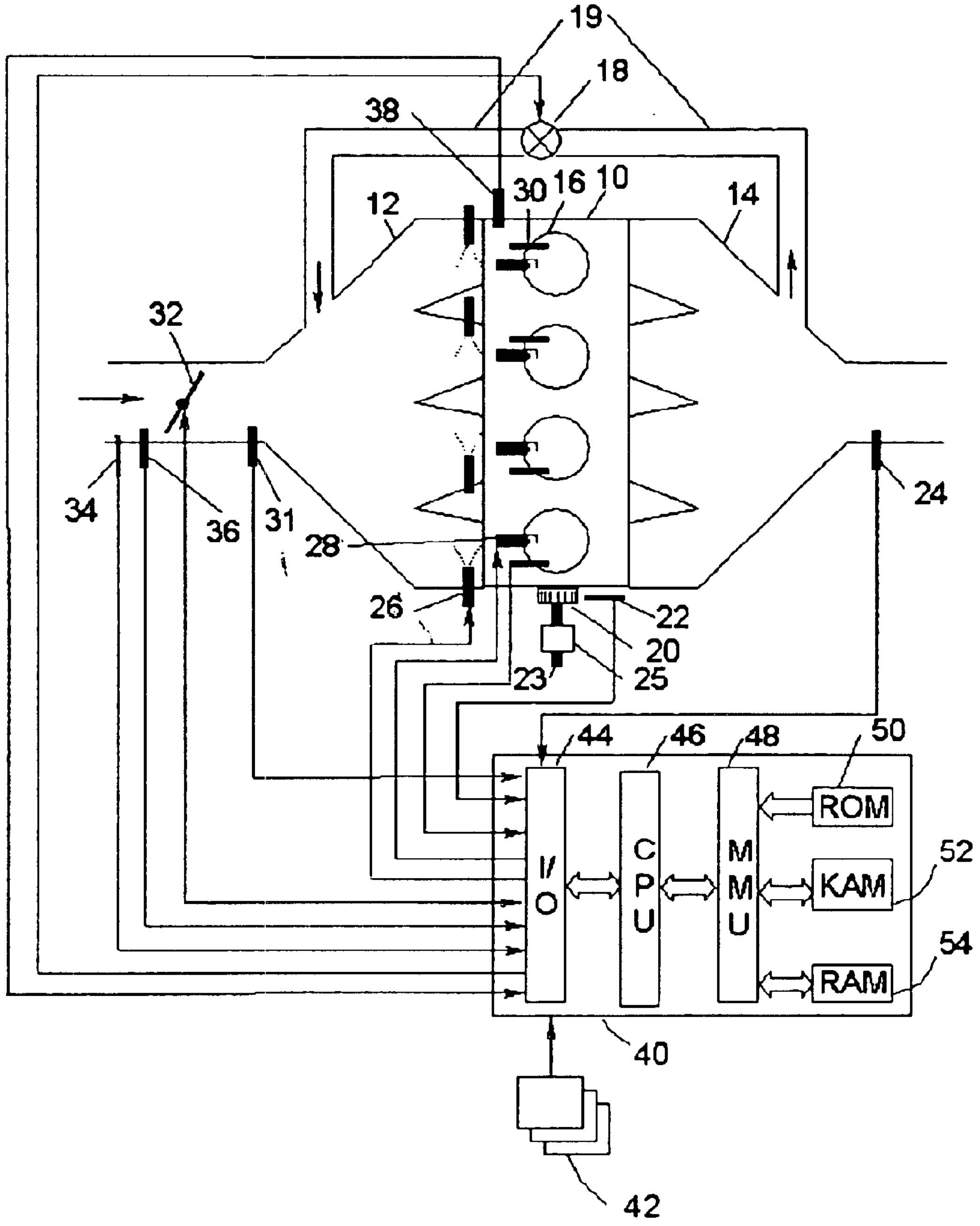
FIG. 1 is a schematic of an engine equipped with sensors according to an aspect of the present invention.

A 4-cylinder internal combustion engine 10 is shown, by way of example, in FIG. 1. Engine 10 is supplied air through intake manifold 12 and discharges spent gases through exhaust manifold 14. An intake duct upstream of the intake manifold 12 contains a throttle valve 32 which, when actuated, controls the amount of airflow to engine 10. Sensors 34 and 36 installed in intake manifold 12 measure air temperature and mass airflow (MAF), respectively. Sensor 31, located in intake manifold 14 downstream of throttle valve 32, is a manifold absolute pressure (MAP) sensor. A partially closed throttle valve 32 causes a pressure depression in intake manifold 12. When a pressure depression exists in intake manifold 12, exhaust gases are caused to flow through exhaust gas recirculation (EGR) duct 19, which connects exhaust manifold 14 to intake manifold 12. Within EGR duct 19 is EGR valve 18, which is actuated to control EGR flow. Fuel is supplied to engine 10 by fuel injectors 26. Each cylinder 16 of engine 10 contains a spark plug 26. A pressure transducer 30 is shown installed in each cylinder 16. The crankshaft (not shown) of engine 10 is coupled to a toothed wheel 20. Sensor 22, placed proximately to toothed wheel 20, detects engine 10 rotation. Engine output shaft 23 coupled to the crankshaft of engine 10 is coupled to a transmission (not shown). An in-line torque sensor 35 is coupled to output shaft 23. Sensor 24, in exhaust manifold 14, is an exhaust gas component sensor. Exhaust gas component sensor 24 is an exhaust gas oxygen sensor. Alternatively, exhaust gas component sensor 24 is a wide-range oxygen sensor, a nitrogen oxide sensor, a hydrocarbon sensor, or other gas component sensor as may become available.

Continuing to refer to FIG. 1, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve 32 position, spark plug 26 timing, EGR valve 18. Various other sensors 42 and specific sensors (engine speed sensor 22, in-line torque sensor 25, cylinder pressure transducer sensor 30, engine coolant sensor 38, manifold absolute pressure sensor 31, exhaust gas component sensor 24, air temperature sensor 34, and mass airflow sensor 36) communicate input through I/O interface 44 and may indicate engine rotational speed, vehicle speed, coolant temperature, manifold pressure, pedal position, cylinder pressure, throttle valve position, air temperature, exhaust temperature, exhaust stoichiometry, exhaust component concentration, and air flow. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 60 may contain multiple ROM 50, RAM 54, and KAM 52 coupled to MMU 48 or CPU 46 depending upon the particular application.

According to the present invention, a value of a cylinder specific performance parameter (estPP,n) for the nth cylinder is computed as the sum of cylinder specific information, DACCEL,n, and information which applies to the engine as a whole, PPall:

$$estPP,n=b_0*DACCEL,n+PP\text{all} \quad (1)$$

where PPall is an engine performance parameter which is determined based on output of sensors and/or data available onboard conventional, production vehicles and is discussed further below. Constant $b_0$ is determined as discussed below. DACCEL,n is the deviation in engine rotational acceleration of the nth cylinder from average engine rotational acceleration (ACCELavg) and, by way of example, is computed as:

$$DACCEL,n=ACCEL,n\ ACCELavg \quad (2)$$

where ACCEL,n is engine rotational acceleration of the nth cylinder, which in one example is computed according to the method taught in U.S. Pat. No. 5,056,360, assigned to the assignee of the present invention and incorporated in its entirety herein by reference. In '360, the interval and phase at which engine rotational speed is measured is determined to provide accurate and substantially independent rotational acceleration measures for each expansion stroke in each cylinder. In a four-stroke engine, each cylinder undergoes the processes of intake, compression, expansion (combustion), and exhaust to complete a cycle. It is the expansion stroke which provides an indication of the efficacy of the combustion process. If the engine is a four-cylinder engine, the expansion strokes of the cylinders are evenly spaced over two revolutions of engine 10. One expansion event occurs every 180 degrees and no two expansion strokes overlap in time. It is described in '360 how to determine the phase and duration over which to compute ACCEL,n for situations in which the expansion stroke of one cylinder overlaps the expansion stroke of another cylinder, as is the case in engines with greater than four cylinders. ACCELavg is computed, for example, as described in U.S. Pat. No. 5,044,194, assigned to the assignee of the present invention and incorporated in its entirety herein by reference. In '194 a sliding median filter is used to determine ACCELavg, i.e., ACCELavg is the median of the prior measures of ACCEL,n. Alternatively, other measures of average, such as mean, are used in place of median. Also, the window over which the prior events are used in averaging is determined so as to provide a smooth measure of ACCELavg without damping the information about the change in ACCELavg of the engine. The averaging window to determine ACCELavg is on the order of one engine revolution, depending on the data bandwidth of crankshaft position from which ACCELavg is computed.

The engine performance parameter (PPall) is determined over all the cylinders, collectively. It is based on any combination of air charge (AIR_CHG), engine speed (RPM), fuel pulse width (FPW), commanded air-fuel ratio (AFR), measured air-fuel ratio, concentration of an exhaust gas component, exhaust gas temperature, spark advance (SA), intake manifold absolute pressure (MAP), position of an exhaust gas recirculation (EGR) valve, accelerator pedal position, barometric pressure, engine coolant temperature, fuel injection timing, fuel injection supply pressure, valve timing, exhaust backpressure, and others. AIR_CHG is an estimate of the mass of air expected to be trapped in the cylinder as a result of an intake stroke. AIR_CHG is computed based on the output of the MAF sensor, which provides a measure of the amount of air inducted into the engine. Alternatively, AIR_CHG is based on engine RPM and MAP. FPW is the duration that a fuel injector is commanded to remain open. Thus, FPW relates to the amount of fuel delivered during a fuel injection event. EGR relates to a quantity of exhaust gases which are routed to the intake manifold. SA relates to the time that the spark plugs are commanded to fire in relation to the position of the position. Valve timing relates to the opening and closing events of intake and exhaust valves coupled to the cylinders of the engine and refers to engines equipped with variable valve timing devices.

An example of a cylinder specific performance parameter, which may be according to the present invention, is indicated mean effective pressure, IMEP. IMEP,n is the amount of work done per cylinder in each cylinder divided by the displacement volume of the cylinder:

$$IMEP{,}n = \oint P{,}n\ dV{,}n / DISP \tag{3}$$

where the integral is taken over a complete engine cycle (i.e., 720 degrees revolution for a four-stroke engine and 360 degrees for a two-stroke engine), P,n is the pressure in cylinder n, V,n is the volume above the piston in the nth cylinder, and dV,n is the change in volume. The cylinder pressure, P,n, is measured by cylinder pressure transducer 30 in the nth cylinder and V,n may be computed based on engine geometry and a measure of the crank angle position of the engine from an toothed wheel 20 and sensor 22 coupled to engine 10 or other device, such as an optical encoder, for determining crank position. The determination of IMEP, according to equation (3) above, is based on pressure measurements from in-cylinder pressure transducers 30, typically in an experimental setting.

According to the present invention, an estimate of IMEP can be determined without relying on in-cylinder pressure transducers 30 by recasting equation (1) in terms of IMEP in place of the generalized performance parameter:

$$estIMEP{,}n = c_0 * DACCEL{,}n + \mathrm{model}IMEP\mathrm{all}. \tag{4}$$

An example of a modeled performance parameter, according to the present invention is:

$$IMEP\mathrm{all} = c_1 + c_2 * AIR\_CHG. \tag{5}$$

Or, a more complicated example:

$$IMEP\mathrm{all} = c_3 + c_4 * AIR\_CHG + c_5 * AIR\_CHG + c_6 * (SA\ SAMBT) + c_7 * MAP + c_8 * SA * AIR\_CHG + c_9 / AFR + c_{10} * AIR\_CHG^2. \tag{6}$$

quation 6 includes three engine parameters with linear, squared, cross terms, etc. SAMBT is MBT spark advance, which is the spark advance which would provide the highest torque. SAMBT is a known quantity for a given set of conditions. Alternatively, modelIMEPavg is determined via a neural network model, look-up tables, a physics based model from first principles, or other models.

By substituting equation (4) into equation (5), e $$estIMEP{,}n = c_0 * DACCEL{,}n + c_1 + c_2 * AIR\_CHG. \tag{7}$$

To determine the values of the constants, $c_0$, $c_1$, and $c_2$ data are collected via laboratory grade pressure sensors installed in each cylinder of engine 10. Cylinder specific pressure data are collected at the same time that other engine parameters are collected. In the case of equation (7), MAF is measured and recorded, from with AIR_CHG can be computed. Alternatively, if the model were based on equation (6), MAP, MAF, SA, and AFR would be measured and recorded. The data are regressed, inserting the measured IMEP in equation (7) as the term estIMEP,n, to determine the values of the constants.

Additionally, the measured IMEP data via the laboratory pressure measurements are used to validate the form of the model employed, i.e., the appropriate form of estIMEP,n. That is, to determine whether a simple form of the model, such as equation (6), or a complicated form of the model, such as equation (7), is more appropriate.

Finally, if the vehicle were equipped with in-cylinder pressure transducers, the present invention can be used to advantage to detect errors in the measurement due to sensor drift, sensor malfunction, electrical integrity, or others.

Figure 2:
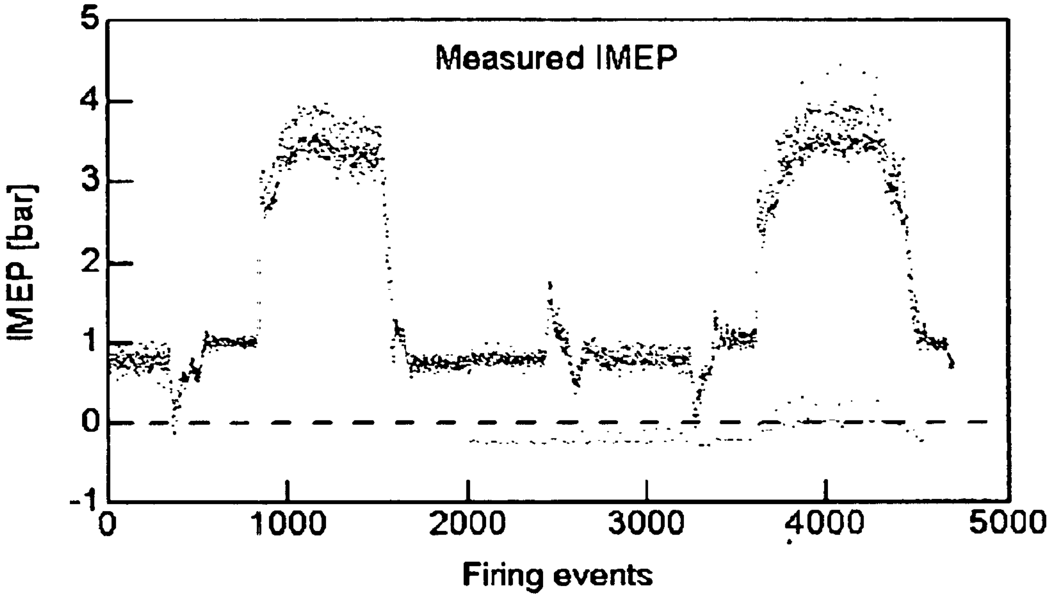
FIG. 2 is a graph of measured IMEP for approximately 6000 combustion cycles of a four-cylinder engine, measure IMEP is based on in-cylinder pressure transducer measurements.

To determine the efficacy of the present invention, data was collected from a four-cylinder, homogeneous-charge, spark-ignition engine, which was operated at a variety of operating conditions and with intentional misfiring in one cylinder. Laboratory grade in-cylinder pressure transducers 30 were used to collect cylinder pressure data from all four cylinders. IMEP was determined based on pressure transducer measurements in each cylinder. In FIG. 2, the resulting IMEP is shown for each sequential firing for cylinders 1, 3, 4, and 2 (firing order of this particular engine) as they undergo approximately 1500 combustion events each (6000 total for the engine). The engine is being operated at a fairly low IMEP condition between events 0 and 900. From events 900 to about 1500, IMEP is at a moderate level. At approximately event 2000, a misfire was caused to occur in approximately every $25^{th}$ event by interrupting spark plug firing every 25 events. Consequently, every time that a spark plug fails to fire, that cylinder has a negative IMEP indicating that the misfiring cylinder absorbs more energy in undergoing a cycle than it provides. The data represented in FIG. 2 are derived from laboratory grade in-cylinder pressure transducers 30 and laboratory quality data acquisition systems. Having such data available on board a production vehicle is highly desirable. However, production engines are rarely equipped with in-cylinder pressure measuring equipment. A primary aspect of the present invention is to provide an alternative to in-cylinder pressure measuring equipment to obtain substantially similar information as that represented in FIG. 2.

Figure 3:
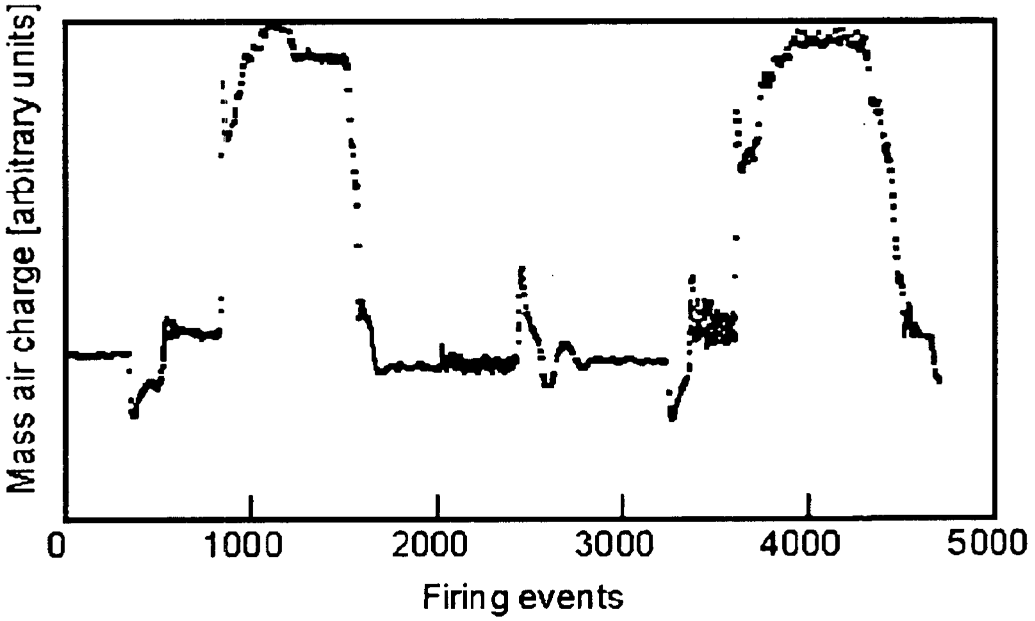
FIG. 3 is a graph of AIR_CHG over the same test cycle shown in FIG. 2.

As mentioned above, the present invention relies on production sensors or data available within ECU 60. Data based on one such sensor, a MAF sensor, is shown in FIG. 3. The data of FIG. 3 are over the same interval as those shown in FIG. 2. Throttle valve 32 was adjusted during the test period causing AIR_CHG of the engine to vary by a factor of three over the test period. By comparing FIG. 3 to FIG. 2, it can be seen that the general shape of the two are in excellent agreement. However, because AIR_CHG is a quantity that applies to the entire engine, i.e., no cylinder specific information is contained therein, some of the features of FIG. 2 are missing in FIG. 3. Most notably, the misfires that are shown in FIG. 2 between events 2000 and 6000 are not detected in FIG. 3. The present example utilizes only AIR_CHG information as shown in equation (5).

Figure 4:
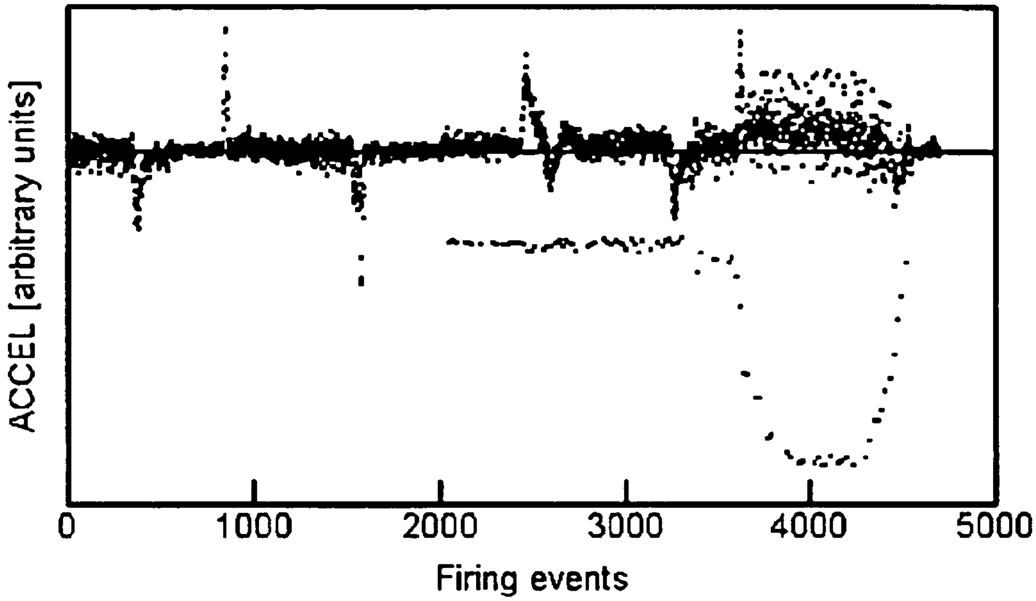
FIG. 4 is a graph of engine acceleration computed to determine the contribution by individual cylinders for each firing event, taken over the same test cycle as FIG. 2.
Figure 5:
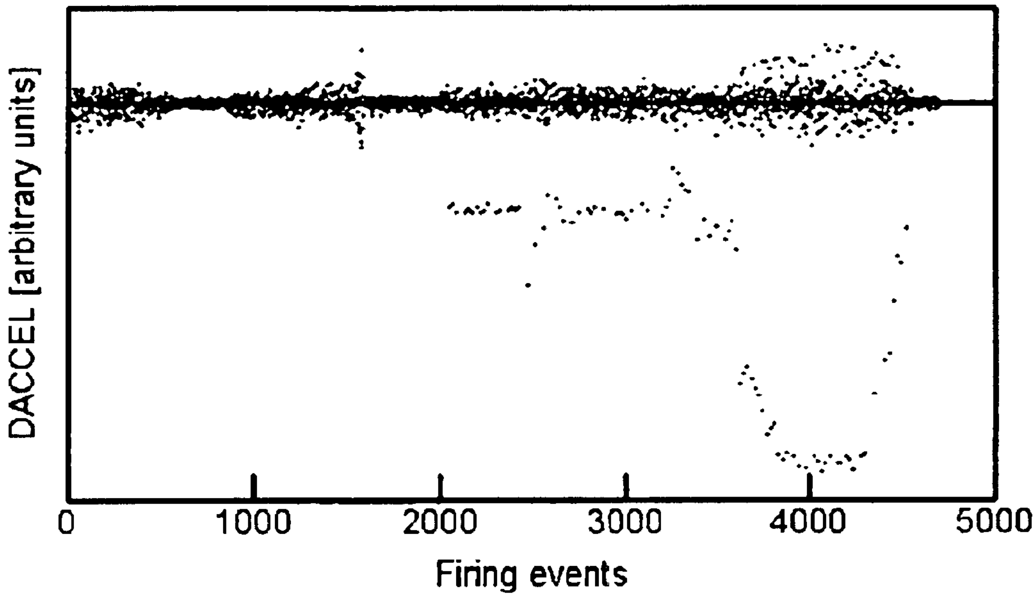
FIG. 5 is a graph of deviation in engine acceleration for individual cylinders for each firing event, taken over the same test cycle as FIG. 2.

Engine rotational acceleration (ACCEL) is plotted in FIG. 4, shown for the same test duration of FIGS. 2 and 3. The rotational acceleration is computed in such a way as to correspond with the combustion events of each of the cylinders. FIG. 4 shows consecutive measurements of the contribution of cylinders 1, 3, 4, and 2 in succession. ACCEL, shown in FIG. 4, is computed based on a signal from a production engine speed sensor, such as 22 shown in FIG. 1. DACCEL is computed based on ACCEL and shown in FIG. 5.

Figure 6:
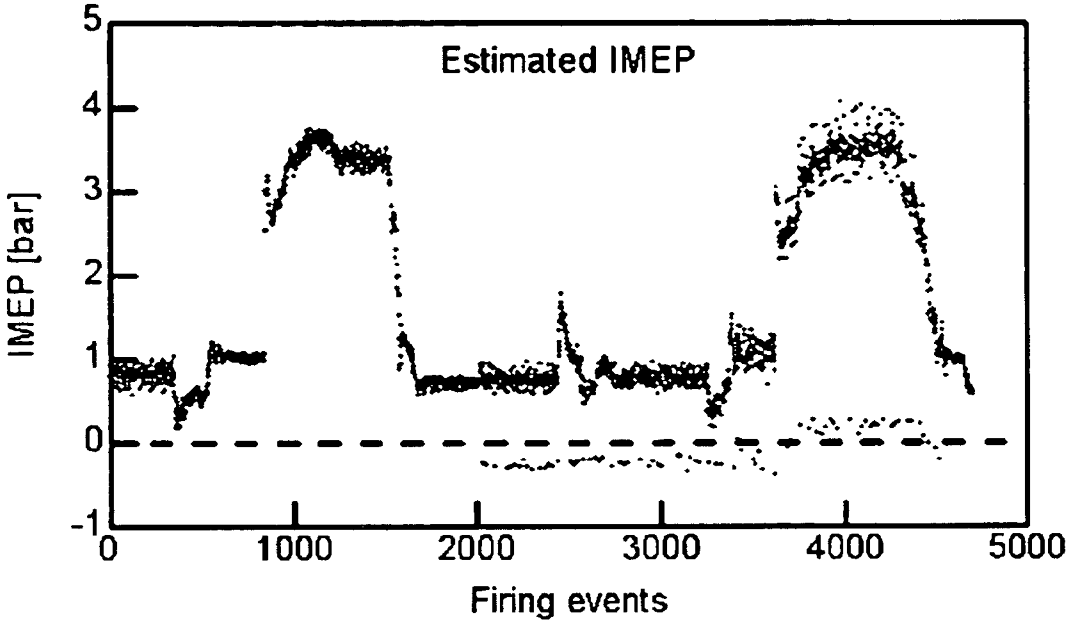
FIG. 6 is a graph of estimated IMEP, according to an aspect of the present invention.

In FIG. 6, estIMEP,n is shown, which is computed according to equation (7) above:

$$estIMEP,n=c_0*DACCEL,n+c_1+c_2*AIR\_CHG \quad (7)$$

where $c_0$, $c_1$, and $c_2$ are found by regressing measured IMEP data, computed, according to equation (7) above, against DACCEL,n and AIR_CHG, where the measured IMEP is inserted in for estIMEP,n. After determining the values of the constants, estIMEP,n was computed based on production sensors (a MAF sensor in the present example) and is shown in FIG. 6. The results in FIG. 2 based on laboratory grade equipment and the results in FIG. 6, according to the present invention, are in excellent agreement.

The efficacy of the method has been shown for the test conditions employed represented in FIGS. 2–6. FIG. 6, which was determined according to an aspect of the present invention, excellently represents the data collected by in-cylinder pressure transducers, which is represented in FIG. 2. The success depends, in part, on the choice of the model employed, which in the present example is equation (5). To satisfy unusual operating conditions in a homogeneous-charge, spark-ignition engine, a more complicated form of the engine performance parameter (PPall) may be found to be more accurate than equation (5) used for the example situation discussed. Additionally, the present invention can be applied to engines with other combustion types, such as: 1diesel, homogeneous-charge compression ignition, direct injection spark ignition, and others. Alternatively, models based on other data, eg., FPW, MAP, EGR, AFR, and combinations thereof, yield a more suitable, or accurate, model of PPall. As mentioned above, other types of models, such as neural nets, lookup tables, first principle physics based models, are other examples of models that can be used to describe any of the engine types discussed.

Alternatively, instead of using DACCEL,n in the above equations, which is the deviation in engine rotational acceleration of the nth cylinder from average engine rotational acceleration, a torque deviation of the nth cylinder, DT,n, is used. The signal from in-line torque sensor 25 is used to determine torque deviation associated with the torque delivered by each of the cylinders. It is known by those skilled in the art that it is difficult to obtain a reliable measure of absolute torque from an in-line torque sensor. However, in-line torque sensors accurately measure deviations in torque, which is suitable for use in the present invention. Thus, to use DT,n in place of DACCEL,n, a suitable model is: e $$stIMEP,n=c_0'*DT,n+c_1+c_2*AIR\_CHG \quad (8)$$

where $c_0'$ is a calibration constant determined analogously to $c_0$ of equation 7. Alternatively, other models involving DT,n may be found to more accurately represent estIMEP,n. Furthermore, another alternative is to base estIMEP,n on both DT,n and DACCEL,n if both an inline torque sensor and a speed sensor are available.

The specific example provided has estIMEP,n as the performance parameter.

Alternatively, work done per cylinder or torque contribution per cylinder can be computed analogously as IMEP. The above equations may be recast for these alternative quantities or other quantities based on combinations of IMEP, work, and torque.

Engine performance parameter has been described in terms of a quantity, such as indicated mean effective pressure, that applies to the engine as a whole. However, there are situations in which it is useful to define a performance parameter which is associated with a group of cylinders, where the group of cylinders is less than all cylinders in the engine. For example, a V-8 engine comprises 2 four-cylinder banks of cylinders. There are occasions in the operation of the engine that it is desirable to command a different spark advance, fuel-air ratio, or other parameter to each bank of the cylinder. In this case, one or more performance parameter can be determined for one or more groups of cylinders. Another example is in an engine with a variable displacement engine (VDE). The displacement is varied in a VDE by deactivating one or more cylinders in the engine, thus operating on a lesser displacement than the engine's displacement as a whole. Typically, valves are deactivated to deactivate a cylinder. In this case, a performance parameter is computed for the group of cylinders that are not deactivated, i.e., activated cylinders.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

What is claimed is:

1. A method for determining a cylinder specific performance parameter for a cylinder of a multi-cylinder internal combustion engine, comprising the steps of:

determining a performance parameter representative of engine output across a first group of cylinders based on an engine operating parameter, said first group of cylinders comprising at least three cylinders wherein said performance parameter is based on air charge;

determining a cylinder deviation parameter representative of engine output of a single combustion event in the cylinder; and calculating the cylinder specific performance parameter based on said performance parameter and said cylinder deviation parameter.

2. The method of claim 1 wherein said group of cylinders comprises all cylinders in the engine.

3. The method of claim 1 wherein said group of cylinders comprises cylinders in a cylinder bank of the engine.

4. The method of claim 1 wherein the engine is a variable displacement engine having some engine cylinders that are deactivatable and said first group of cylinders comprising activated cylinders.

5. The method of claim 1 wherein said cylinder deviation parameter comprises engine rotational acceleration deviation defined by a difference between a cylinder specific rotational acceleration associated with the combustion event in the cylinder and average engine rotational acceleration.

6. The method of claim 5 wherein said cylinder specific rotational acceleration and said average engine rotational acceleration are based on a signal from a crankshaft position sensor coupled to the engine.

7. The method of claim 1 wherein said cylinder deviation parameter comprises torque deviation defined by a difference between a cylinder specific torque associated with the combustion event in the cylinder and average engine.

8. The method of claim 7 wherein said cylinder specific torque and said average engine torque are based on a signal from an in-line torque sensor coupled to an output shaft of the engine.

9. The method of claim 1 wherein the engine has spark plugs disposed in the cylinders and said engine performance parameter is based on a spark timing of the engine.

10. The method of claim 1 wherein said cylinder specific performance parameter is cylinder specific indicated mean effective pressure.

11. The method of claim 1 wherein said performance parameter is based on a neural net model.

12. A method for determining a cylinder specific performance parameter for a cylinder of a multi-cylinder internal combustion engine, comprising the steps of:

determining a performance parameter representative of engine output across a first group of cylinders based on an engine operating parameter, said first group of cylinders comprising at least three cylinders wherein said performers parameter is based on a fuel pulse width commanded to fuel injectors disposed in the engine;

determining a cylinder deviation parameter representative of engine output of a single combustion event in the cylinder; and calculating the cylinder specific performance parameter based on said performance parameter and said cylinder deviation parameter.

13. The method of claim 12 wherein said performance parameter is further based on a timing of said fuel injection, said timing is measured relative to said engine rotational position.

14. A method for estimating a cylinder specific performance parameter for a cylinder of a multi-cylinder internal combustion engine, comprising the steps of:

determining a rotational speed of the engine over a prior time interval;

determining an engine rotational acceleration deviation associated with a single combustion event in the cylinder based on said rotational speed;

determining a value of a performance parameter representative of engine output across a group of engine cylinders; and determining the cylinder specific performance parameter based on said engine rotational acceleration deviation and said performance parameter.

15. The method of claim 14, further comprising the steps of:

determining a cylinder specific rotational acceleration associated with the combustion event in the cylinder based on said rotational speed of the engine;

determining a rotational acceleration average based on said rotational speed, said rotational acceleration average is averaged over all cylinders of the engine; and determining said engine rotational acceleration deviation based on the difference between said cylinder specific rotational acceleration and said rotational acceleration average.

16. The method of claim 14 wherein said performance parameter associated with a group of cylinders is based on output of one or more sensors coupled to the engine.

17. The method of claim 16 wherein said sensors provide information indicative of said group of cylinders.

18. The method of claim 14 wherein said rotational acceleration average is based on a median value of rotational acceleration over said prior time interval.

19. The method of claim 14 wherein said prior interval comprises less than about two revolutions of the engine.

20. The method of claim 14 wherein the cylinder specific performance parameter is indicated mean effective pressure of the cylinder.

21. The method of claim 14 wherein said performance parameter associated with said group of cylinders is based on a mass rate of airflow to the engine.

22. The method of claim 14 wherein the engine is spark ignited and said performance parameter associated with said group of cylinders is based on a mass rate of airflow to the engine and a spark timing of the engine.

23. The method of claim 14 wherein said group of engine cylinders comprises all cylinders in the engine.

24. The method of claim 14 wherein said group of engine cylinders comprises cylinders in a cylinder bank of the engine.

25. The method of claim 14 wherein said engine performance parameter associated with said group of cylinders is based on a fuel pulse width commanded to fuel injectors disposed in the engine.

26. The method of claim 14 wherein said engine performance parameter associated with said group of cylinders is based on a timing of said fuel injection, said timing is determined relative to said engine rotational position.

27. The method of claim 14, further comprising the step of determining whether a misfire event has occurred in the cylinder based on said cylinder specific performance parameter.

28. A system capable of computing an indicated mean effective pressure for a cylinder of an internal combustion engine, said cylinder being a member of a group of cylinders in the engine, said system comprising:

a crankshaft position sensor coupled to the engine; and an electronic control unit operably connected to the engine and said crankshaft position sensor, said unit determining an engine rotational acceleration deviation for a single cylinder based on a signal from said crankshaft position sensor, said unit further determining indicated mean effective pressure for all cylinders of the engine, said unit further determining the cylinder specific indicated mean effective pressure of the cylinder based on said engine rotational acceleration deviation for the cylinder and said indicated mean effective pressure for the engine.

29. The system of claim 28 wherein said indicated mean effective pressure for the engine is determined based on a signal from at least one sensor coupled to the engine.

30. The system of claim 28, further comprising a mass air flow sensor coupled to an intake of the engine, said indicated mean effective pressure for the engine is determined based on a signal from said mass air flow sensor.

31. The system of claim 28, further comprising a manifold absolute pressure sensor coupled to an intake of the engine, said indicated mean effective pressure for the engine is determined based on a signal from said manifold absolute pressure sensor.

32. The system of claim 28 wherein said indicated mean effective pressure for the engine is determined based on a value of fuel pulse width commanded to fuel injector disposed in the engine.

33. The system of claim 28 wherein said indicated mean effective pressure for the engine is determined based on ignition timing.

34. A computer readable storage medium having stored data representing instructions executable by a computer to compute a cylinder specific performance parameter for a cylinder of an internal combustion engine, said cylinder being a member of a group of cylinders in said engine, comprising:

instructions to determine a value of a measured engine quantity over a prior interval;

instructions to determine a deviation value of said measured engine quantity, said deviation value being associated with a single combustion event in the cylinder;

instructions to determine a performance parameter representative of engine output across the group of cylinders wherein said performance parameter associated with the group of cylinders is based on at least one of air flow and fuel pulse width; and instructions to determine the cylinder specific performance parameter for the cylinder based on said deviation value and said performance parameter of said group of cylinders.

35. The medium of claim 34 wherein said performance parameter associated with the group of cylinders is further based on one or more of spark timing and, fuel injection timing.

36. The medium of claim 34 wherein said measured engine quantity is engine rotational acceleration, which is based on a signal from a crankshaft position sensor coupled to the engine.

37. The medium of claim 34 wherein said measured engine quantity is engine torque, which is based on a signal from an in-line torque sensor coupled to the engine.

38. The medium of claim 34 wherein the group of cylinders comprises all engine cylinders.

39. The medium of claim 34 wherein the cylinder specific performance parameter is computed for each fuel providing event to each cylinder.

40. The medium of claim 34 wherein the cylinder specific performance parameter comprises cylinder specific indicated mean effective pressure.

41. The medium of claim 34 wherein the cylinder specific performance parameter comprises cylinder specific work.

42. The medium of claim 34 wherein the cylinder specific performance parameter comprises cylinder specific torque.

* * * * *